(12) United States Patent
Shih et al.

(10) Patent No.: US 7,140,777 B2
(45) Date of Patent: Nov. 28, 2006

(54) HYDRODYNAMIC BEARING ASSEMBLY

(75) Inventors: Wun-Chang Shih, Tu-Cheng (TW);
Ching-Hsing Huang, Tu-Cheng (TW);
Chien-Long Hong, Tu-Cheng (TW);
Huan-chao Lin, Tu-Cheng (TW);
Hsien-Sheng Pei, Tu-Cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 126 days.

(21) Appl. No.: 11/018,338

(22) Filed: Dec. 20, 2004

(65) Prior Publication Data

US 2006/0133702 A1 Jun. 22, 2006

(51) Int. Cl.
*F16C 32/06* (2006.01)

(52) U.S. Cl. ...................... 384/100; 384/115

(58) Field of Classification Search ............. 384/100, 384/107, 113–115, 119; 310/90; 417/354, 417/423.12, 423.13; 360/99.08, 98.07
See application file for complete search history.

(56) References Cited

U.S. PATENT DOCUMENTS

| 4,557,610 | A | | 12/1985 | Asada et al. |
| 5,270,737 | A | * | 12/1993 | Nakasugi et al. ........... 384/107 |
| 5,822,846 | A | * | 10/1998 | Moritan et al. ............. 384/115 |
| 6,250,807 | B1 | | 6/2001 | Mori et al. |
| 6,513,979 | B1 | | 2/2003 | Mori et al. |
| 2004/0126040 | A1 | * | 7/2004 | Shih et al. ................... 384/100 |

* cited by examiner

*Primary Examiner*—Thomas R. Hannon
(74) *Attorney, Agent, or Firm*—Morris Manning & Martin; Tim Tingkang Xia, Esq.

(57) ABSTRACT

A hydrodynamic bearing assembly comprises a bearing (10) defining a bearing hole (12) therein, a shaft (20) rotatably received in the bearing hole with a bearing clearance formed between a bearing surface of the bearing and an outer surface of the shaft, and a cover (40) attached to a top end of the bearing. The bearing clearance is filled with lubricant. A locking groove (22) is formed in an outer periphery of the shaft. The cover defines a through hole (42) receiving the shaft at the locking groove. Interlocking devices are formed on the cover and the bearing to join the cover and the bearing.

22 Claims, 3 Drawing Sheets

HYDRODYNAMIC BEARING ASSEMBLY

TECHNICAL FIELD

The present invention relates generally to bearing assemblies, and more particularly to a bearing assembly of a hydrodynamic type.

BACKGROUND

Due to request for low abrasion on rotational elements to achieve an extended life and for low extent of noise, hydrodynamic bearings have been used in conventional motors such as fan motors or HDD motors.

A typical hydrodynamic bearing comprises a bearing surface to define a bearing hole, and a shaft rotatably received in the bearing hole with a bearing clearance formed between the bearing surface of the bearing and an outer surface of the shaft. Lubricating oil is filled in the bearing clearance. Hydrodynamic pressure generating grooves are provided in either the bearing surface of the bearing or the outer surface of the shaft. Upon rotating of the shaft, the lubricant is driven with the rotating shaft due to the viscosity of the lubricant. A lubricating film is thus formed in the bearing clearance by means of hydrodynamic action of the hydrodynamic pressure generating grooves, so as to support the shaft without radial contact between the shaft and the bearing.

In designing the hydrodynamic bearing, the following factors must be considered. Firstly, appropriate sealing is required at ends of the bearing. This is because, on one hand, the lubricating oil must not leakage from ends of the bearing, or a lubricating oil shortage may occur, which results in a failure of generation of the hydrodynamic press; On the other hand, the lubricating oil must not be polluted by outside dusts entering the bearing, because the dusts will affect the viscosity of the lubricant, which probably also leads to a failure of generation of the hydrodynamic press. Secondly, during motor operation, especially in a fan motor, the rotor rotating at high speed tends to float over the bearing. Such float will cause the rotor to come off the bearing. Therefore, measures must be taken to control the extent of such float to prevent the rotor from coming off the bearing.

For the foregoing reasons, there is a need for a hydrodynamic bearing assembly which can prevent lubricant leakage, lubricant pollution and rotor's coming off the bearing.

SUMMARY OF THE INVENTION

The present invention is directed to a hydrodynamic bearing assembly for use with a motor which has both sealing and shaft retaining capabilities.

A hydrodynamic bearing assembly comprises a bearing defining a bearing hole therein, a shaft rotatably received in the bearing hole with a bearing clearance formed between a bearing surface of the bearing and an outer surface of the shaft, and a cover attached to a top end of the bearing. The bearing clearance is filled with lubricant. A locking groove is formed in an outer periphery of the shaft. The cover defines a through hole receiving the shaft at the locking groove. Interlocking devices are formed on the cover and the bearing to join the cover and the bearing.

Other objects, advantages and novel features of the present invention will be drawn from the following detailed description of the preferred embodiments of the present invention with attached drawings, in which:

DESCRIPTION OF PREFERRED EMBODIMENTS

Figure 1:
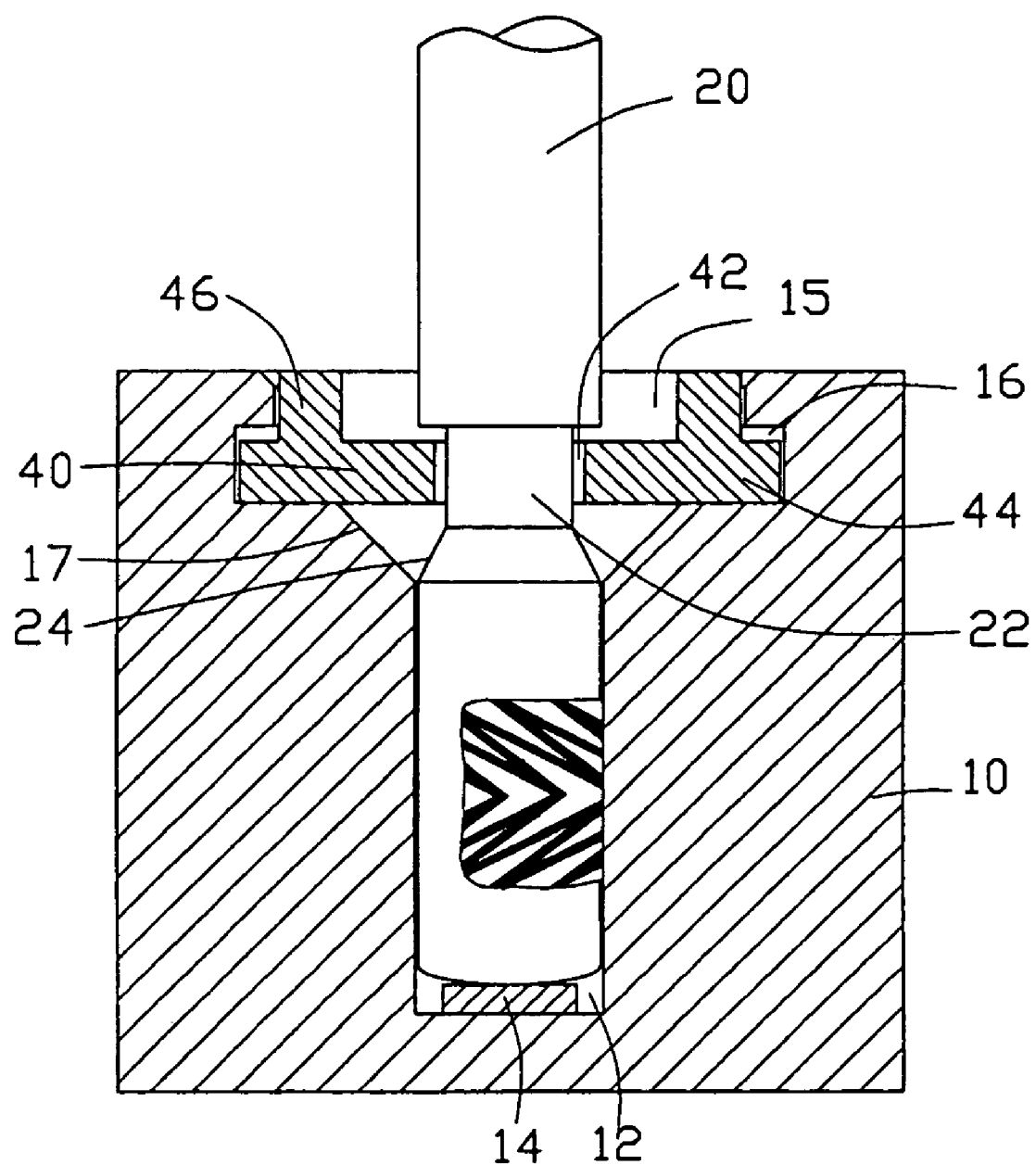
FIG. 1 is a cross sectional view of a hydrodynamic bearing assembly according to a preferred embodiment of the present invention.

Referring to FIG. 1, a hydrodynamic bearing assembly comprises a bearing 10 having a bearing surface to define a bearing hole 12, a shaft 20 rotatably received in the bearing hole 12 with a bearing clearance formed between the bearing surface of the bearing 10 and an outer surface of the shaft 10, and a cover 40 attached to a top end of the bearing 10. Lubricant such as lubricating oil or lubricating grease is filled in the bearing clearance. Hydrodynamic pressure generating grooves are provided in either the bearing surface of the bearing 10 or the outer surface of the shaft 20. Upon rotating of the shaft 20, a lubricating film is formed in the bearing clearance by means of hydrodynamic action of the hydrodynamic pressure generating grooves, so as to support the shaft 20 without radial contact between the shaft 20 and the bearing 10.

The bearing 10 has a generally U-shaped cross section with a bottom end thereof being closed. A thrust washer 14 is disposed at a bottom of the bearing hole 12 for axially supporting the shaft 20. The thrust washer 14 consists of resin material or the like having high lubricity, so as to reduce the friction against the shaft end.

The bearing 10 defines at the top end thereof an end opening 15 that is greater than the bearing hole 12 in diameter. An annular inner mounting groove 16 is formed in an inner periphery of the bearing 10 at the end opening 15. A tapered surface 17 is formed on the inner periphery of the bearing 10 between the bearing surface and the inner mounting groove 16 of the bearing 10.

The shaft 20 forms an annular locking groove 22 in the outer periphery thereof, corresponding to the inner mounting groove 16 of the bearing 10. The shaft 20 also forms a tapered surface 24 corresponding to the tapered surface 17 of the bearing 10.

The cover 40 consists of plastic material having good resiliency such as nylon. The cover 40 comprises a generally annular body having a center through hole 42 for allowing the shaft 20 to extend therethrough. A diameter of the through hole 42 is greater than a diameter of the shaft 20 at the locking groove 22, but less than a diameter of the shaft 20 at portions other than the locking groove 22. A circumferential portion 44 is sized so as to be receivable in the mounting groove 16 of the bearing 10. An annular flange 46 extends upwardly from the body of the cover 40 adjacent the circumferential edge thereof. The flange 46 is configured to be just receivable in the end opening 15 of the bearing 10.

In assembly, the cover 40 is pressed into the end opening 15 of the bearing 10. The cover 40 deforms to permit it to enter into the end opening 15. As the cover 44 reaches the mounting groove 16 of the bearing 10, the cover 40 deforms back to its original state so that the circumferential portion 44 thereof extends into the mounting groove 16 to limit an axial movement (vertical movement) of the cover 40 with respect to the bearing 10. Simultaneously, the flange 46 is compliantly received in the end opening 15 to limit a radial movement (horizontal movements) of the cover 40 with respect to the bearing 10. Therefore, the cover 40 is secured to the top end of the bearing 10. The shaft 20 is then pressed into the through hole 42 of the cover 40 to resiliently expand the through hole 42. The shaft 20 passes the expanded through hole 42 until the shaft 20 at the locking groove 22 is received in the through hole 42. Since the diameter of the shaft 20 at other portions is greater than the diameter of the through hole 42, the cover 40 at the through hole 42 engages the shaft 20 at the locking groove 22, thereby preventing the shaft 20 from axially coming off the bearing 10.

In the present invention, the cover 40 prevents the shaft 20 from coming off the bearing 10. In addition, the cover 40 blocks the way connecting an inside and an outside of the bearing 10. Thus, lubricant is prevented from spilling off the bearing 10, and dusts or the like outside the bearing 10 is stopped from entering the bearing 10 to pollute the lubricant.

In the present invention, the cover 40 is integrated with the bearing 10 prior to assembly of a motor such as a fan motor. The assembly of the motor is thus simplified, thereby increasing the assembling efficiency thereof.

Figure 2:
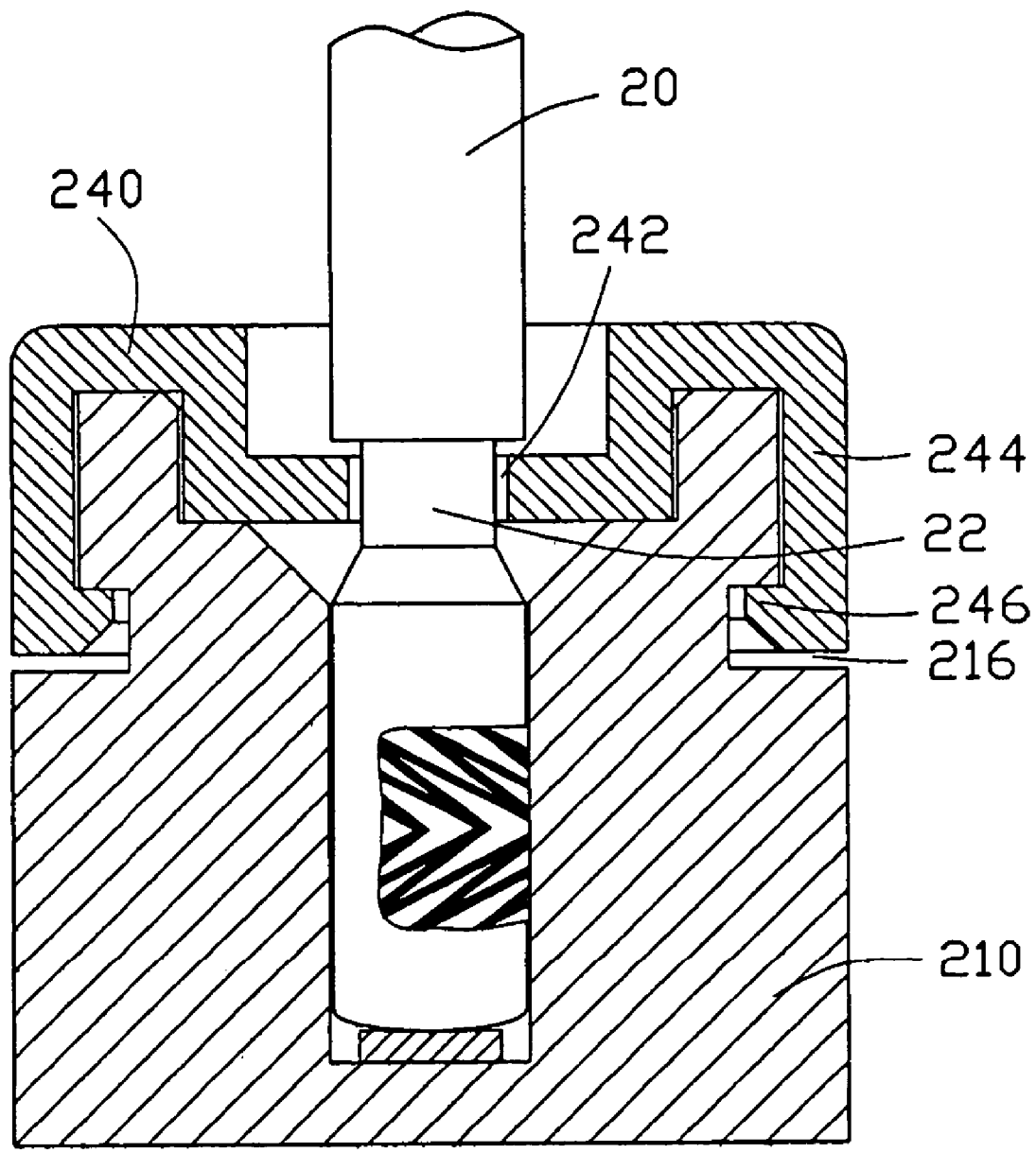
FIG. 2 is a cross sectional view of a hydrodynamic bearing assembly according to an alternative embodiment of the present invention.

FIG. 2 shows a hydrodynamic bearing assembly according to an alternative embodiment of the present invention. The hydrodynamic bearing assembly of the alternative embodiment comprises a bearing 210, a shaft 20, and a cover 240 secured to a top end of the bearing 210. The shaft 20 has the same configuration as in the preferred embodiment.

The bearing 210 at the top end thereof has an outer diameter less than that of other portion of the bearing 210. An outer mounting groove 216 is defined in an outer periphery of the bearing 210 at the top end thereof. An end opening (not labeled) that is larger than the bearing hole is defined in the top end of the bearing 210.

The cover 240 has a generally annular body defining a center through hole 242 for receiving the shaft 20 at the locking groove 22 thereof. An annular peripheral wall 244 depends from an outer circumferential edge of the cover 240, surrounding the bearing 210 at the top end thereof. A thickness of the peripheral wall 244 is designed so as to make the outer circumferential surface of the peripheral wall 244 flush with the outer circumferential surface of the bearing 210 at the other portion thereof. An annular inward flange 246 is formed at a free edge (bottom edge) of the peripheral wall 244. The inward flange 246 extends into the mounting groove 216, thereby securing the cover 240 to the top end of the bearing 210. A center portion of the cover 240 where the through hole 242 is formed is recessed into the end opening of the bearing 210.

Figure 3:
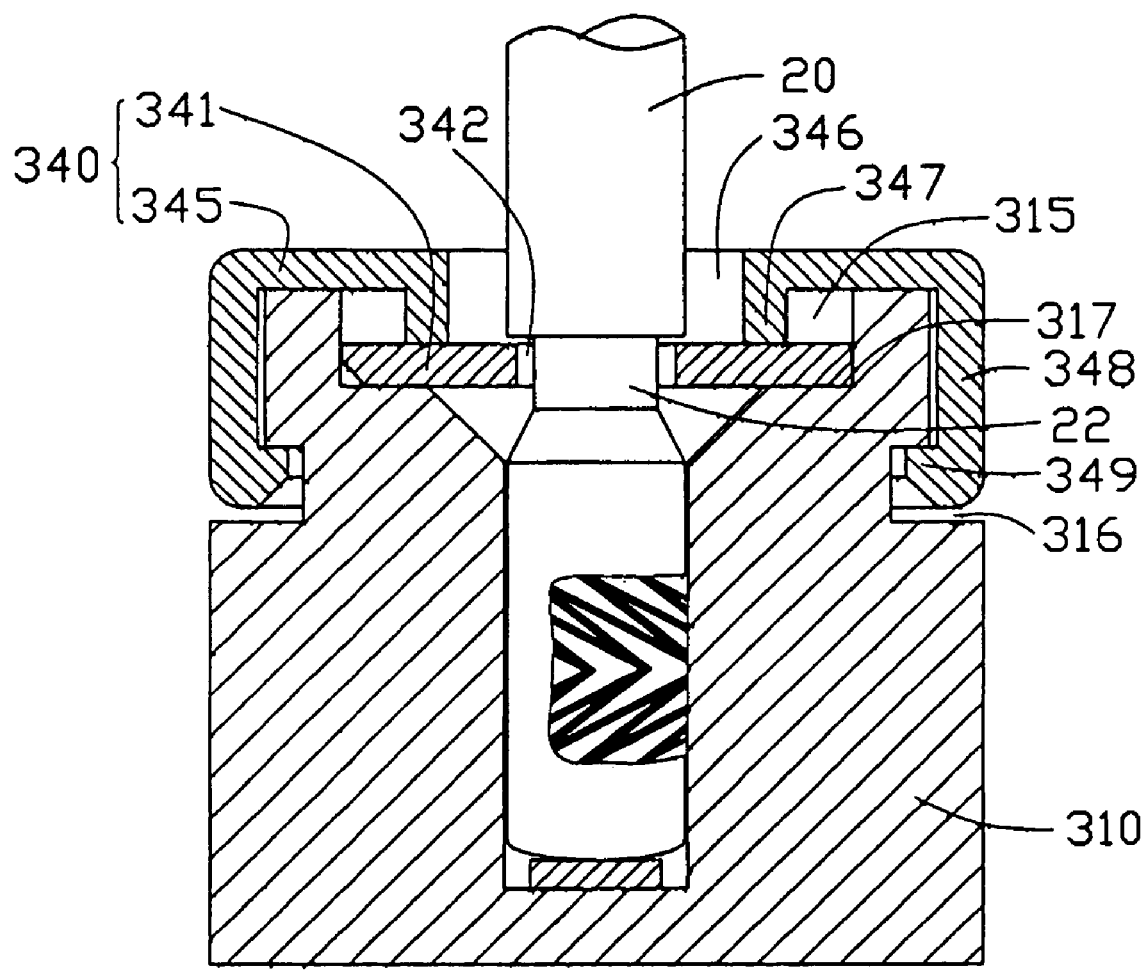
FIG. 3 is a cross sectional view of a hydrodynamic bearing assembly according to a further alternative embodiment of the present invention.

FIG. 3 shows a hydrodynamic bearing assembly according to a further alternative embodiment of the present invention. The hydrodynamic bearing assembly of the further alternative embodiment comprises a bearing 310, a shaft 20, and a cover 340 secured to a top end of the bearing 310. The shaft 20 has the same configuration as in the preferred embodiment.

The bearing 310 at the top end thereof has an outer diameter less than that of other portion of the bearing 310. An outer mounting groove 316 is defined in an outer periphery of the bearing 310 at the top end thereof. An end opening 315 that is greater in diameter than the bearing hole is defined in the top end of the bearing 310. An annular horizontal surface 317 is thus formed by such diameter difference, facing the open side of the bearing 310.

The cover 340 comprises an annular inner locking plate 341 seated on the horizontal surface 317 of the bearing 310, and an annular outer positioning member 345 secured to the top end of the bearing 340. The locking plate 341 defines a center through hole 342 for receiving the shaft 20 at the locking groove 22 thereof.

The positioning member 345 defines a center through aperture 346 for extension of the shaft 20. An annular rib 347 depends from the positioning member 345 at the through aperture 346 to press the locking plate 341 against the horizontal surface 317, thereby positioning the locking plate 341 in place. An annular peripheral wall 348 depends from an outer circumferential edge of the positioning member 345, surrounding the bearing 310 at the top end thereof. A thickness of the peripheral wall 348 is designed so as to make the outer circumferential surface of the peripheral wall 348 flush with the outer circumferential surface of the bearing 310. An annular inward flange 349 is formed at a free edge (bottom edge) of the peripheral wall 348. The inward flange 349 extends into the mounting groove 316, thereby securing the positioning member 345 to the top end of the bearing 310.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A hydrodynamic bearing assembly comprising:
  a bearing defining an end opening at a top end thereof;
  a shaft rotatably received in the bearing with lubricant filled between the shaft and the bearing, the shaft forming an annular groove in an outer periphery thereof; and
  a cover attached to the bearing to enclose the lubricant in the bearing and limit movement of the shaft in an axial direction relative to the cover, the cover comprising an inner locking plate received in the end opening and an outer positioning member secured to the top end of the bearing to position the inner locking plate in place, the locking plate defining a through hole to receive the shaft at the annular groove, and the positioning member defining a through aperture for extension of the shaft.

2. The hydrodynamic bearing assembly as described in claim 1, wherein an outer mounting groove is formed in an outer periphery of the bearing at the top end thereof, an annular peripheral wall depending from an outer circumferential edge of the outer positioning member, an inward flange extending from a free edge of the peripheral wall into the outer mounting groove.

3. The hydrodynamic bearing assembly as described in claim 2, wherein the bearing at the top end thereof has an outer diameter less than that of other portion of the bearing, and the thickness of the peripheral wall is set so as to make an outer circumferential surface of the peripheral wall flush with an outer circumferential surface of the bearing at the other portion thereof.

4. The hydrodynamic bearing assembly as described in claim 2, wherein a rib depends from the outer positioning member at the through aperture, and the rib abuts the inner locking plate.

5. The hydrodynamic bearing assembly as described in claim 1, wherein the bearing defines a bearing hole therein receiving the shaft, the end opening being greater than the bearing hole in diameter at the top end thereof, the cover comprising a recessed portion extending into the end opening.

6. The hydrodynamic bearing assembly as described in claim 1, wherein the bearing has a generally U-shaped cross section with a bottom end opposite to the top end being closed.

7. The hydrodynamic bearing assembly as described in claim 1, wherein an inner mounting groove is formed in an inner periphery of the bearing at the top end, and an outer periphery of the locking plate radially extends into the inner mounting groove.

8. The hydrodynamic bearing assembly as described in claim 7, wherein an inner diameter of the cover at the inner periphery thereof is greater than a diameter of the shaft at the annular groove but less than the diameter of the shaft at opposite axial ends of the annular groove.

9. The hydrodynamic bearing assembly as described in claim 1, wherein the cover is made of resilient material so as to be mounted to the bearing by deformation of the cover itself.

10. A hydrodynamic bearing assembly comprising:
a bearing defining a bearing hole therein;
a shaft rotatably received in the bearing hale with a bearing clearance formed between a bearing surface of the bearing and an outer periphery of the shaft, the bearing clearance filled with lubricant, a locking groove being formed in the outer periphery of the shaft;
a cover attached to a top end of the bearing, the cover defining a through hole receiving the shaft at the locking groove;
wherein interlocking devices are formed on the cover and the bearing to join the cover and the bearing;
wherein the bearing defines an end opening that is greater than the bearing hole in diameter at the top end thereof, and the cover is mounted in the end opening; and
wherein said interlocking devices comprise an annular inner mounting groove formed in an inner periphery of the bearing at the end opening, and an outer circumferential portion of the cover engaged in the inner mounting groove.

11. The assembly as described in claim 10, wherein said interlocking devices further comprise an annular flange extending upwardly from the cover and abuttingly received in the end opening.

12. A hydrodynamic bearing assembly comprising:
a bearing defining a bearing hole therein, an end opening that is greater than the bearing hole in diameter defined at a top end of the bearing, an annular mourning groove formed in a periphery of the bearing at the end opening;
a shaft rotatably received in the bearing and forming an annular groove in an outer periphery thereof; and
a cover attached to the bearing, comprising an outer circumferential portion engaged in the mounting groove of the bearing, an inner circumferential portion engaged in the annular groove of the shaft, and an annular flange extending upwardly therefrom, the annular flange being received in the end opening of the bearing.

13. The hydrodynamic bearing assembly as described in claim 12, wherein the mounting groove is formed in an inner periphery of the top end of the bearing.

14. The hydrodynamic bearing assembly as described in claim 12, wherein the mounting groove is formed in an outer periphery of the top end of the bearing.

15. The hydrodynamic bearing assembly as described in claim 14, wherein the cover further comprises a positioning member extending transversely from a free end of the annular flange and secured to the top end of the bearing to position the cover in place.

16. The hydrodynamic bearing assembly as described in claim 15, further comprising an annular peripheral wall depending from an outer circumferential edge of the positioning member, and an inward flange extending from a free edge of the peripheral wall, the inward flange being engaged into the mounting groove.

17. The hydrodynamic bearing assembly as described in claim 16, wherein the bearing at the top end thereof has an outer diameter less than that of other portion of the bearing, and a thickness of the peripheral wall is set so as to make an outer circumferential surface of the peripheral wall flush with an outer circumferential surface of the bearing at the other portion thereof.

18. The hydrodynamic bearing assembly as described in claim 12, wherein the bearing has a generally U-shaped cross section with a bottom end opposite to the top end being closed.

19. The hydrodynamic bearing assembly as described in claim 12, wherein an inner diameter of the cover at the inner periphery thereof is greater than a diameter of the shaft at the annular groove but less than the diameter of the shaft at opposite axial ends of the annular groove.

20. The hydrodynamic bearing assembly as described in claim 12, wherein the annular flange abuts the top end of the bearing.

21. The hydrodynamic bearing assembly as described in claim 12, wherein the cover is integrally formed and is made of resilient material.

22. The hydrodynamic bearing assembly as described in claim 12, wherein the annular flange and the inner circumferential portion of the cover are separately formed, the annular flange being spaced from the top end of the bearing.

* * * * *